United States Patent
Shaw et al.

(10) Patent No.: US 6,320,583 B1
(45) Date of Patent: Nov. 20, 2001

(54) METHODS AND APPARATUSES FOR CONTROLLING TRANSFORMATION OF TWO AND THREE-DIMENSIONAL IMAGES

(75) Inventors: Christopher D. Shaw, Santa Cruz; Orion Wilson, West Lake Village, both of CA (US)

(73) Assignee: Haptek Corporation, Santa Cruz, CA (US)

( * ) Notice: Subject to any disclaimer, the term of this patent is extended or adjusted under 35 U.S.C. 154(b) by 0 days.

(21) Appl. No.: 09/557,943

(22) Filed: Apr. 24, 2000

Related U.S. Application Data

(63) Continuation of application No. 08/882,721, filed on Jun. 25, 1997, now Pat. No. 6,147,692.

(51) Int. Cl.$^7$ ........................................... G06T 11/00
(52) U.S. Cl. ............................................... 345/433
(58) Field of Search ................................. 365/433, 442, 365/435, 441

(56) References Cited

U.S. PATENT DOCUMENTS

| | | | |
|---|---|---|---|
| 5,611,037 | * 3/1997 | Hayashi | 345/442 |
| 5,659,625 | * 8/1997 | Marquardt | 345/435 |
| 6,147,692 | * 11/2000 | Shaw et al. | 345/433 |

* cited by examiner

*Primary Examiner*—Almis R. Jankus
*Assistant Examiner*—Huedung X. Cao
(74) *Attorney, Agent, or Firm*—Kenyon & Kenyon

(57) ABSTRACT

Methods and apparatuses described herein automate and confer additive properties to morphs (modification of a starting graphical image to a destination graphical image). The enhanced automated additive morphs created by this invention extend the currently limited scope of animation techniques, creating: moving morphs, where characters can speak, move, and emote during the morphing process; parametric character creation, where features can be sequentially added to a character to create a wide variety of resulting characters; behavioral transference, where character behavior can be automatically transferred to newly created characters, and behavioral layering whereby sequential behavior patterns can be concurrently transferred or imparted to a character. The present invention allows an animator to create, animate, control and transform two and three dimensional images instantaneously and fluidly. The invention provides a superior solution at significantly less cost which extends the range and properties of existing state of the art animation.

15 Claims, 15 Drawing Sheets

METHODS AND APPARATUSES FOR CONTROLLING TRANSFORMATION OF TWO AND THREE-DIMENSIONAL IMAGES

RELATED APPLICATIONS

This application is a continuation of U.S. application Ser. No. 08/882,721 filed on Jun. 25, 1997 now U.S. Pat. No. 6,147,692.

FIELD OF THE INVENTION

The present invention pertains to automated methods and apparatuses for the controlling and transforming of two and three-dimensional images. More particularly, the present invention relates to methods and apparatuses for changing the elements of image through the use of one or more sets of modification data in real time.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Referring to FIG. 8, a computer system that is known in the art is shown. The computer system 810 includes a system unit having a processor 811, such as a Pentium® processor manufactured by Intel Corporation, Santa Clara, Calif. The processor is coupled to system memory 812 (e.g., Random Access Memory (RAM)) via a bridge circuit 813. The bridge circuit 813 couples the processor 811 and system memory 812 to a bus 814, such as one operated according to the Peripheral Component Interconnect standard (Version 2.1, 1995, PCI Special Interest Group, Portland, Oreg.). The system unit 810 also includes a graphics adapter 815 coupled to the bus 814 which converts data signals from the bus into information for output at a display 820, such as a cathode ray tube (CRT) display, active matrix display, etc. Using the computer system of FIG. 1, a graphical image can be displayed at display 820. The graphical image can be created internally to the computer system 810 or can be input via an input device 830 (such as a scanner, video camera, digital camera, etc.). As is known in the art, a graphical image is stored as a number of two-dimensional picture elements or "pixels," each of which can be displayed.

In the current art, graphical images (e.g., of a person's face) can be changed by allowing the user to modify a graphical image by "moving" (e.g., with a cursor movement device such as a mouse) the two-dimensional location of one or more pixels (For example: Adobe Photoshop Version 3.0.5 (Adobe Systems, Inc., San Jose, Calif.)). In doing so, the other pixels around the one that is being moved are filled in with new data or other pixel data from the graphical image. For example, the graphical image of the person's face can be modified using this product by making the person's nose larger or smaller. This two-dimensional phenomenon is analogous to stretching and warping a photograph printed on a "rubber sheet." In the Kai's Power Goo product by MetaTools, Inc (Carpinteria, Calif.), photographic distortions can be performed in "real time" by the operator's "clicking and dragging" with a mouse across the surface of a photo displayed on the computer screen. The operator can see the photograph stretch as the mouse is moved. This procedure covers only two dimensional art and does not permit any sophisticated character animation such as speech or emotion.

In the current art, the gradual change of the shape of one image into that of another as seen in film and video is called a "morph". Current morphs are created by an operator who instructs a computer to distort the shape of a specific starting image into the shape of a specific target image. Morphing programs typically work by allowing the operator to select points on the outline of the specific starting image and then to reassign each of these points to a new location, thereby defining the new outline of the desired target image. The computer then performs the morph by: (1) smoothly moving each of these points along a path from start to finish and (2) interpolating the movement of all the other points within the image as the morph takes place.

There are two distinct disadvantages to this method described above. First, it requires that a custom morph be created for each desired transformation. Second, because this method requires the selection of a single image or frame upon which the morph is performed, the frame-by-frame progression of character action must stop during the period in which the morph is performed. This is why in current films, characters do not speak or move during the morph procedure. The reason morphs are currently performed relatively quickly (i.e., within a few seconds) is so that this freezing of action is not fully noticed by the audience.

In recent films, whenever a character morphs (e.g. when the villain robot in James Cameron's "Terminator 2" changes to its liquid metal form), the character ceases moving while the morph takes place. In the "Fifth Element" released in May of 1997, characters are seen changing from alien to human form while they shake their heads back and forth. Although this gives the character the appearance of moving while the morph is taking place, the underlying 3D image of a character's head is actually frozen while it shakes. This method is merely the 3D equivalent of a "freeze frame." This method cannot enable a morphing character to speak, move or emote while a morph is taking place. The static morphing methods used in today's films are slow and considerably expensive.

SUMMARY OF THE INVENTION

According to an embodiment of the present invention a first region of a first graphical image is identified and then it is modified based on a first set of predetermined modification data. Using this method to morph a graphical image, a variety of applications can be performed according to further embodiments of the present invention.

First, the morph (e.g., the application of modification data) for a first starting image can be readily applied to other starting images. In other words, the morphs automatically impart desired characteristics in a custom manner to a multiplicity of starting images. This an improvement over the prior art which requires a customized selection and reassignment of points on a specific starting image to create a morph. A method of the present invention described herein automates this process. Rather than requiring an artist or technician to custom create a morph of a specific image, for example, an adult into that of a child, the morphs of the present invention enable a wide variety of human, animal, or other characters to be rendered chimplike using a single "chimp" morph. An example of this is shown in FIG. 1, where a single morph relating to "chimpification" is applied to three different starting images. In each case, the resulting image maintains recognizable features of the starting image while uniquely embodying the desired characteristics of the "chimp" morph. The morph has been described thus far as modification data. Examples of modification data includes deltasets and deltazones described in more detail below. Briefly, deltasets or zones categorically identify regions, feature by feature within differing starting images so that these images are uniquely altered to preserve the automated morph's desired effect. Because a single morph can be applied to a number of different starting images, the morph exists as a qualitative entity independently from the images it acts upon. This independence creates an entirely new tool, a morph library, a collection of desired alterations or enhancements which can be generically used on any starting image to create specific desired effects as illustrated in the above "chimpification" example.

Second, once an image has been morphed to add a particular characteristic or quality, the resulting image can be subjected to a different morph to add a second characteristic or quality. FIG. 2 illustrates a simple example of this additive property wherein a "chimp" morph is added to a "child" morph to create a childlike chimp (other examples will be described in further detail below). The additive property of the automated, additive morphing system can be used in a number of ways to bring new functionality and scope to the morphing process. Five distinct additive properties of automated, additive morphs will be described below along with their practical application.

Third, morphs can be provided that allow a graphical image character to speak, move, emote, etc. According to an embodiment of the invention, a moving morph can be created during which a character can continue speaking, moving, and emoting by cross applying an automated additive morph to a ("morph sequence"). The morph sequence that is known in the art (such as what is shown in programs by Dr. Michael Cohen at the University of California at Santa Cruz and products of Protozoa Inc. (San Francisco, Calif.) allows for computer-generated characters to move their mouths in a manner which approximates speech by running their characters through a sequence of "Viseme" morphs. (A Viseme is the visual equivalent of a phoneme, i.e. the face one makes when making a phonetic sound.) Such programs use a specific initial image of a character at rest, and a collection of target images. Each target image corresponds to a particular facial position or "Viseme" used in common speech. FIG. 3 shows how these target images can be strung together in a morph sequence to make an animated character approximate the lip movements of speech. This figure shows the sequence of Viseme endpoints which enable the character to mouth the word "pony". It is important to note that the creation and performance of this sequence does not require the special properties of the morphing system presented herein. The morphs within this sequence in the prior art are not generalized (all are distortions of one specific starting image), and they are not additive. Visemes used in the prior art follow one after the other and are not added to one another. According to an embodiment of the present invention, the use of morph sequences is extended to generate not only speech, but also emotive flow and the physical components of emotional reactions.

For example, FIG. 4 shows the cross-addition of an automated, additive morph to the "pony" morph sequence described above in FIG. 3. In that figure, the four vertical columns of character pictures represent the progressive application of the "chimp" morph described earlier (from left to right multiplying the modification data by multiplication values of 0%, 33%, 66%, 100% prior to application to the starting image). Because the "chimp" morph is non-specific as to its starting point (as are all automated additive morphs according to the present invention) it is possible to increasingly apply the "chimp" morph while changing the starting point within the morph Sequence, producing the progression shown in the darkened diagonal of squares. This diagonal progression, shown in horizontal fashion at the bottom of FIG. 4 yields a character which can speak while this character is morphing. This is the underlying structure of the moving morph. Traditional morphs, (being specific rather than generic) cannot be cross-applied in this manner. Characters created using the methods of the present invention can be made to not only speak, but also emote, and react from morph sequences. Thus, characters can remain fully functional during an automated, additive morph rather than being required to "freeze frame" until the morph has been completed as do the morphs of the prior art. An additional benefit of this cross-additive procedure is that morphs can be stopped at any point to yield a fully functional, consistent new character which is a hybrid of the starting and final characters.

Fourth, the methods of the present invention provide for parametric character creation in which newly created characters automatically speak, move, and emote using modification data stored in a database or library. In the automated, additive morphing system, (1) morphs can exist as qualitative attributes independent of any particular starting image, and (2) morphs can be applied, one after the other, to produce a cumulative effect. When qualitative attributes are defined as appearance parameters (length or width of nose, prominence of jaw parameters, roundness of face, etc.) these attributes can be selectively applied in such a way as to create any desired face from one single starting image. As an example, a multi-racial starting character is defined and a morph library of appearance parameters is created which can be used to adjust the characters features so as to create any desired character. FIG. 5 shows an example of this process. The parameter adjustments in this figure are coarse and cartoon-like so as to yield clearly visible variations. In realistic character generation, a much larger number of parameters can be more gradually applied. The first three morphs shown in this illustration are "shape morphs." In the final step of FIG. 5, the coloration or "skin" which is laid over the facial shape is changed rather than the shape itself. This step can be used to create the desired hair color, eye color, skin tone, facial hair, etc. in the resultant character.

Fifth, the parametric character creation described above can be combined with the moving morph, also described above, to create characters which automatically speak, emote and move. This dual application is illustrated in FIG. 6, wherein not only the underlying structure, but also the full speaking and emoting functionality of the original character are automatically transferred to the new character. The character shown in FIG. 6 not only contains a mutable physical appearance, but also a full set of Visemes, emotions, and computer triggered autonomous and reactive behavior. All of these functions can be automatically transferred to a vast range of characters which can be created using parametric character creation. This represents an exponential savings in animation time and cost over existing procedures which require custom creation of not only the character itself, but every emotion, Viseme, blink, etc. that the new character makes.

Sixth, morph sequences can be used simultaneously to combine different behavioral sequences. FIG. 7 illustrates the simultaneous utilization of an emoting sequence and a speaking sequence. In this figure, the Viseme sequence required to make the character say "pony" (left column of pictures) has been added to an emotive morph sequence (center column) in such a manner that the timing of each sequence is preserved. The resultant sequence (right column) creates a character which can simultaneously speak and react with emotions. This procedure can also be used to combine autonomous emotive factors (a computer-generated cycling of deltas representing different emotions or "moods") with reactive factors (emotional deltas triggered by the proximity of elements within the character's environment which have assigned emotive influences on the character). Such procedures can be used to visualize the interplay between conscious and subconscious emotions.

The foregoing examples and other examples of the present invention will be described in further detail below.

BRIEF DESCRIPTION OF THE DRAWINGS

FIGS. 10a–b are polygonal models used for the presentation of a graphical image of a human head or the like.

FIGS. 11a–e and f–are polygonal images showing the application of deltaset in accordance with an embodiment of the present invention.

DETAILED DESCRIPTION

According to an embodiment of the present invention modification data is generated that can be applied to a starting image so as to form a destination image. For example, the modification data can be difference values that are generated by determining the differences between first and second images. Once these differences are determined they can be stored and later applied to any starting image to create a new destination image without the extensive frame-by-frame steps described above with respect to morphing performed in the motion picture industry. These difference values can be created on a vertex-by-vertex basis to facilitate the morphing between shapes that have an identical number of vertices. Alternatively, difference values can be assigned spatially, so that the location of points within the starting image determines the motion within the automated morph. This eliminates the need for explicit identification of vertices and allows these methods and apparatuses to work regardless of a given image's polygonal structure. For simplicity sake we describe an example vertex-based automated additive morphing system below which uses deltasets as the modification data. A position or spatially-based morphing system which can morph images regardless of polygonal structure, such as deltazones (another example of modification data), is created by interpolating the motion between vertices.

An example of the vertices-based embodiment of the present invention includes the generation of a first image (e.g., a neutral or starting image) comprising a first number of vertices, each vertex having a spatial location (e.g., in two or three dimensional space) and a second image is generated (e.g. a target or destination image) having an equal number of vertices. A difference between a first one of the vertices of the first image and a corresponding vertex of the second image is determined representing the difference in location between the two vertices. The difference is then stored in a memory device (e.g., RAM, hard-disc drive, etc.). Difference values for all corresponding vertices of the first and second images can be created using these steps and stored as a variable array (referred to herein as a deltaset). The deltaset can then be applied to the first image to create the second image by moving the vertices in the first image to their corresponding locations in the second image. Alternatively, a multiplication or ratio value can be multiplied by the entries in the deltaset and applied to the first image so that an intermediate graphical image is created. According to a feature of the present invention, the deltaset can be applied to any starting image having an equal number of vertices. This allows the user to create new destination images without performing, again, the mathematical calculations used to create the original deltaset.

Figure 1:
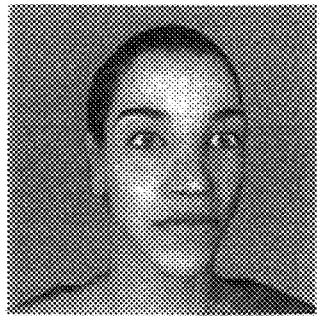
FIG. 1 shows an example of an automated morph according to an embodiment of the present invention.
Figure 1:
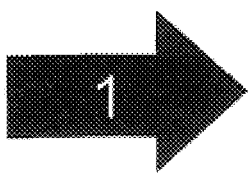
Figure 1:
Figure 1:
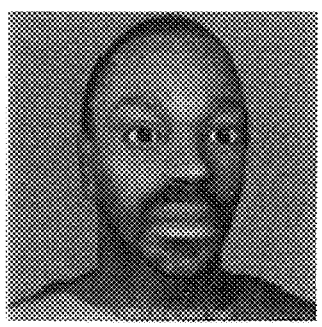
Figure 1:
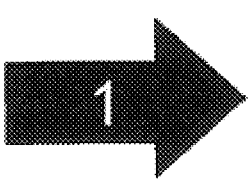
Figure 1:
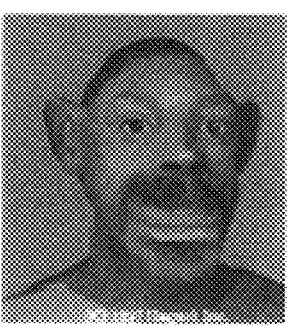
Figure 1:
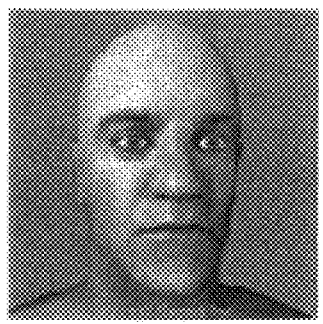
Figure 1:
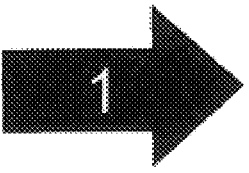
Figure 1:
Figure 2:
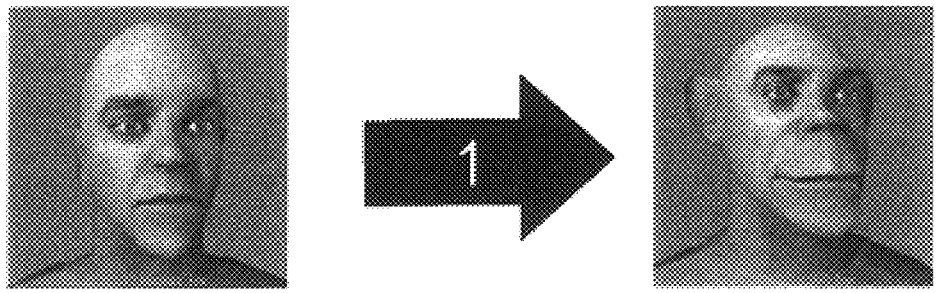
FIG. 2 shows an example of an automated, additive morph according to an embodiment of the present invention.
Figure 2:
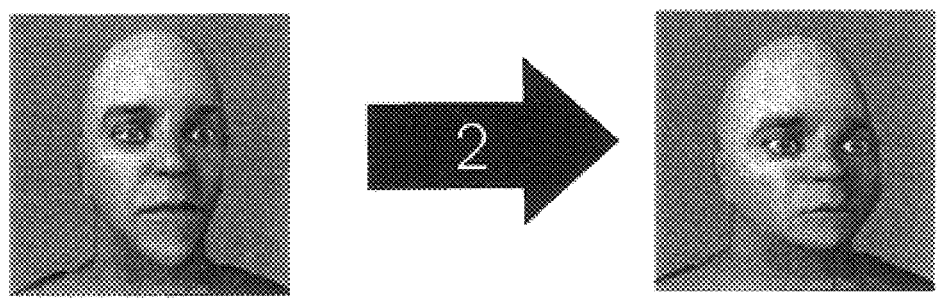
Figure 2:
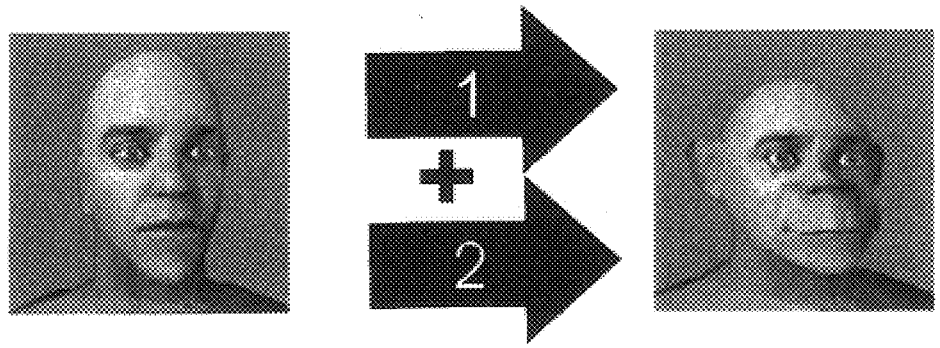
Figure 3:
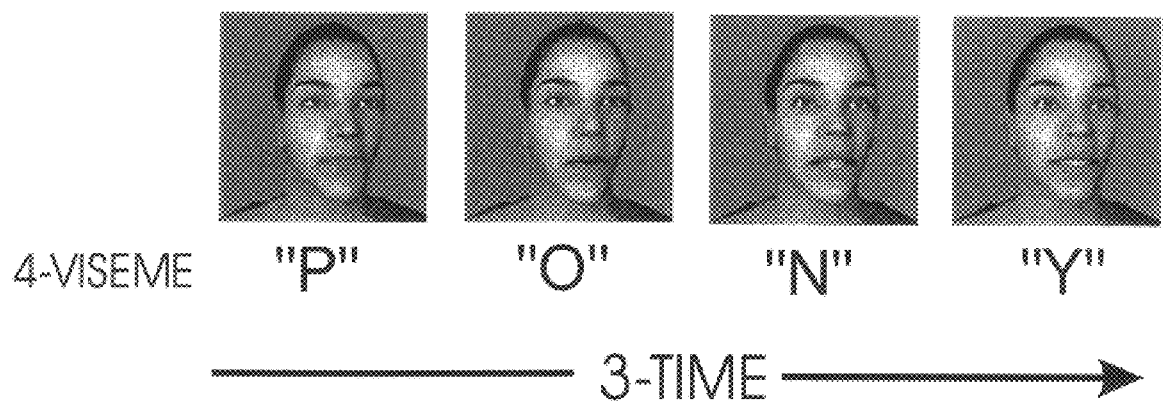
FIG. 3 shows an example of a morph sequence that can be performed according to an embodiment of the present invention.
Figure 4:
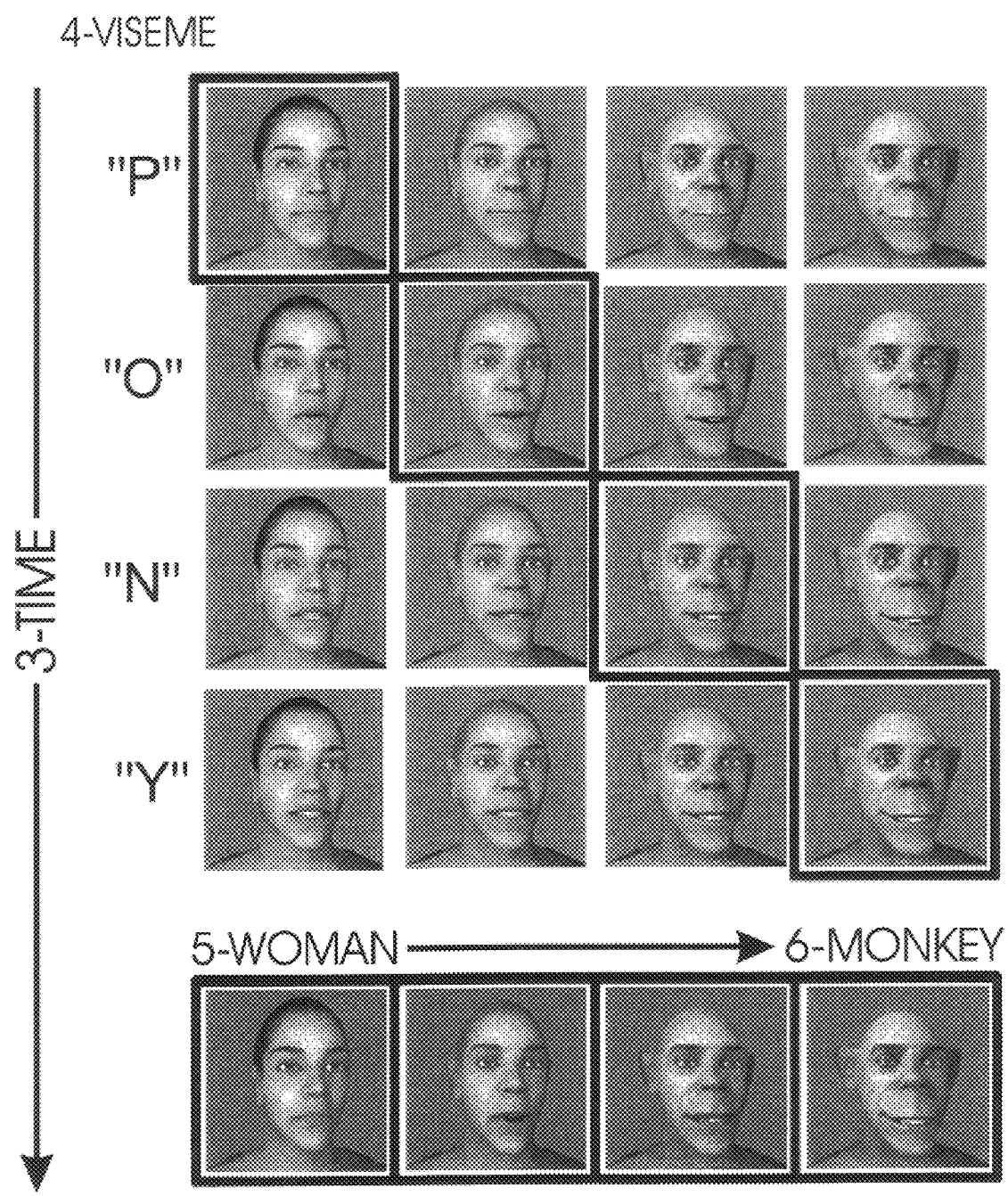
FIG. 4 shows an example of a moving morph according to an embodiment of the present invention.
Figure 5:
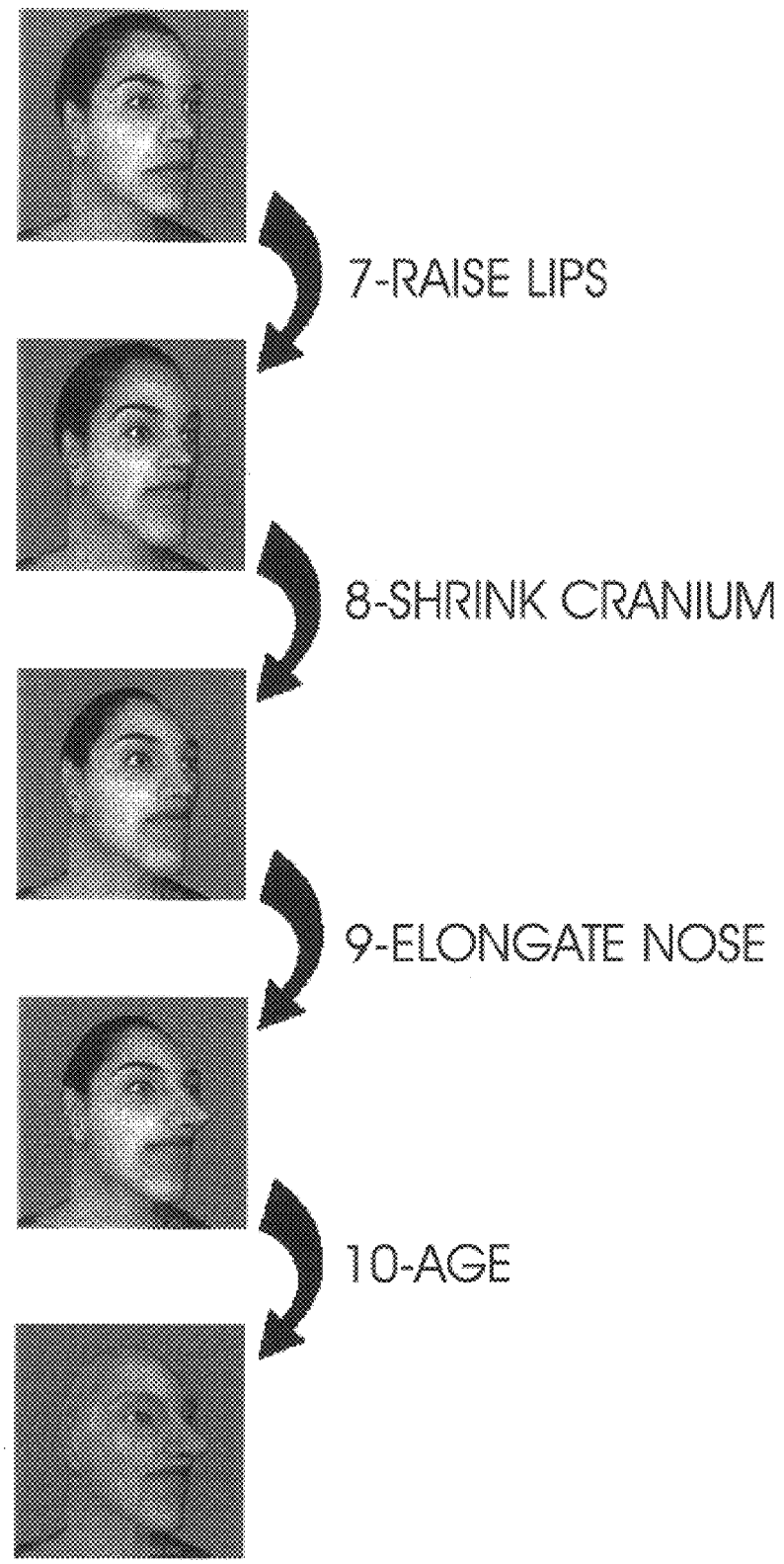
FIG. 5 shows an example of parametric character creation according to an embodiment of the present invention.
Figure 6:
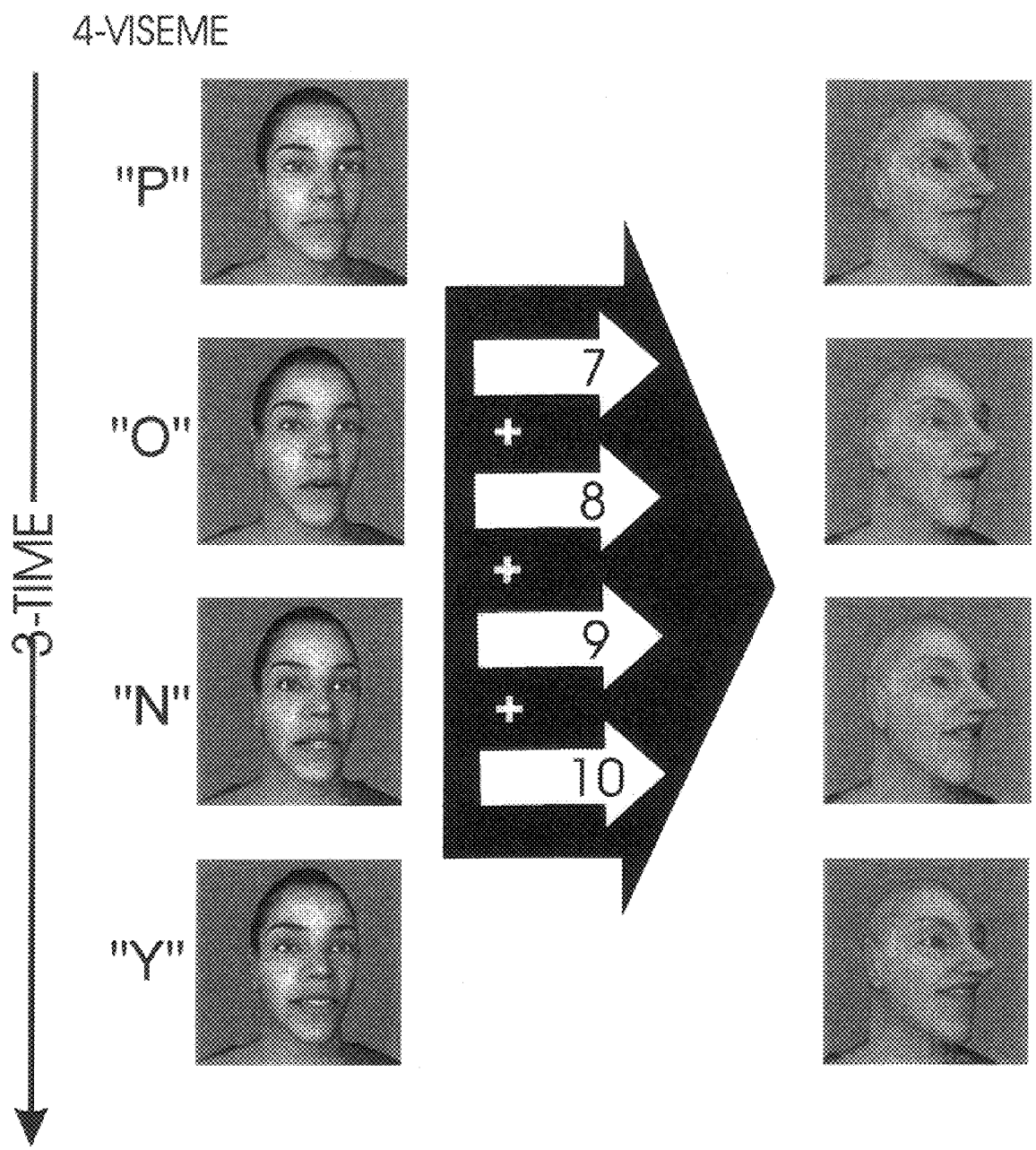
FIG. 6 shows an example of automatic behavioral transference according to an embodiment of the present invention.
Figure 7:
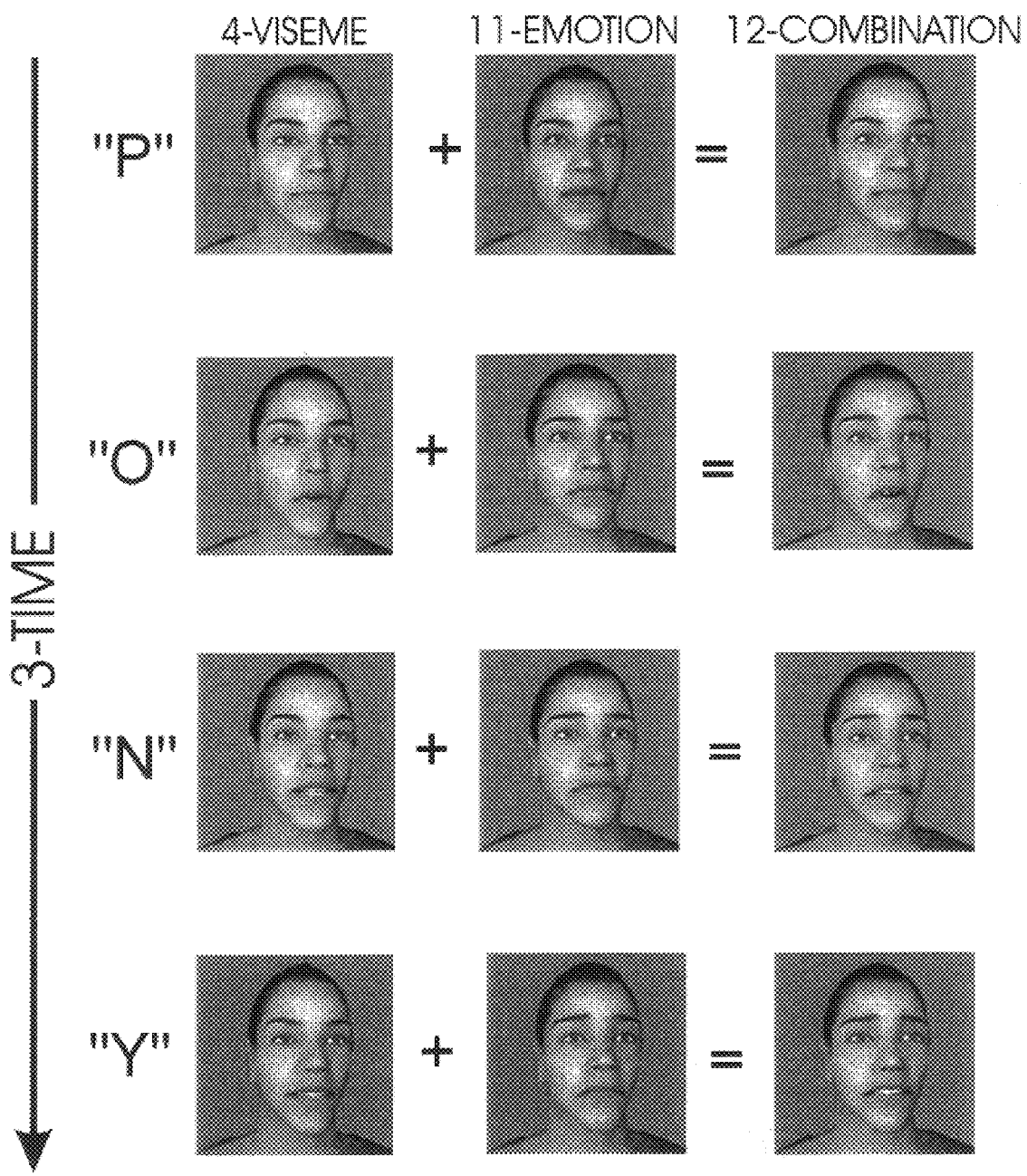
FIG. 7 shows an example of behavioral layering according to an embodiment of the present invention.
Figure 8:
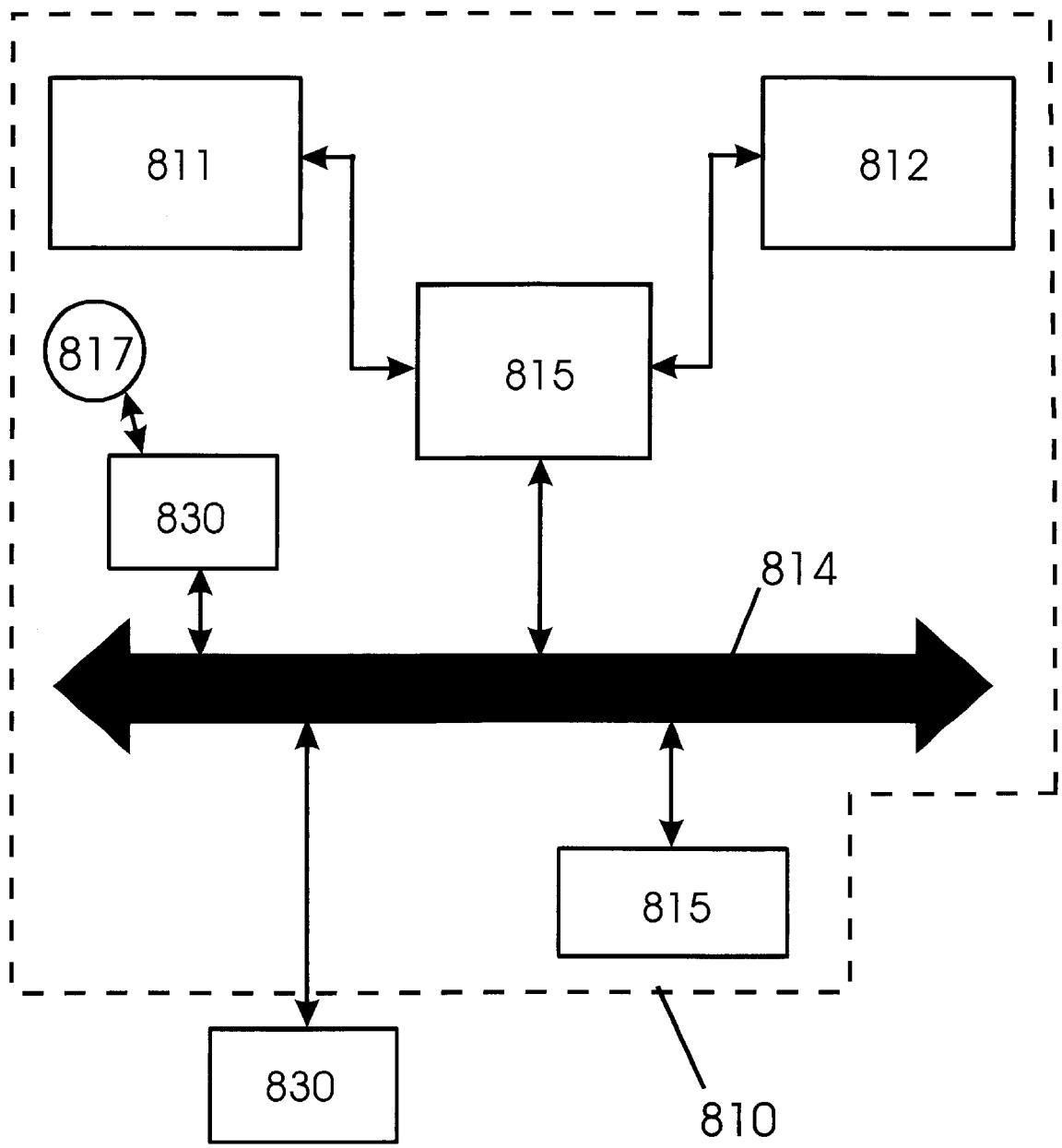
FIG. 8 is a computer system that is known in the art.
Figure 9:
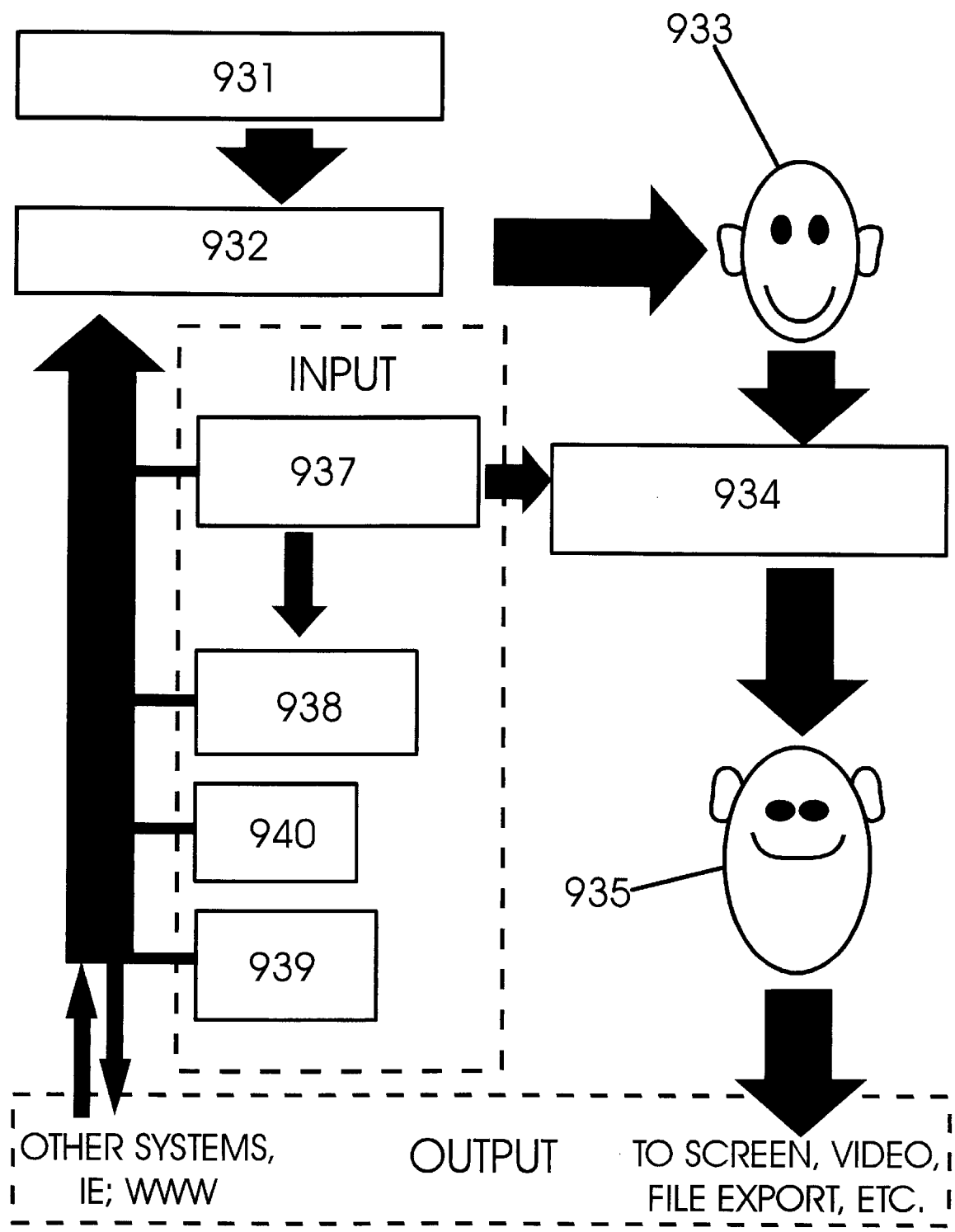
FIG. 9 is a general block diagram of an image transformation system of the present invention.

Referring to FIG. 9, a general block diagram of an image transformation system 900 of the present invention is shown. According to an embodiment of the present invention, the system 900 includes a library or database of deltasets 931. The library of deltasets 931 can be stored in the system memory 912 or any other memory device, such as a hard disc drive 917 coupled to bus 914 via a Small Computer Standard Interface (SCSI) host bus adapter 918 (see FIG. 8). As described in further detail below, deltasets are variable arrays of position change values that can be applied to the vertices of a starting image. Referring to FIG. 9, the deltaset information is composed and cached in device 932 (e.g., processor 811 and system memory 812 of FIG. 8) where it then can be used to transform a first or starting image having a neutral geometry 933 into a target image having a final geometry 935. Additional geometry manipulation can be performed such as the addition of features (e.g., hair) or actions (e.g., looking around) by device 934. Both the starting and second images can then be displayed at display 920, or any other output device (memory) or sent to file export (e.g., the Internet system).

Inputs to the system 900 of FIG. 9 include a variety of user controls 937; autonomous behavior control 938; and face tracker data input 939 which will be further described below. Other inputs can come from other systems such as the so-called World-Wide Web (WWW). Also audio data can be supplied by audio data input device 940 which can be supplied to deltaset caching and composing device 932.

Figure 10A:
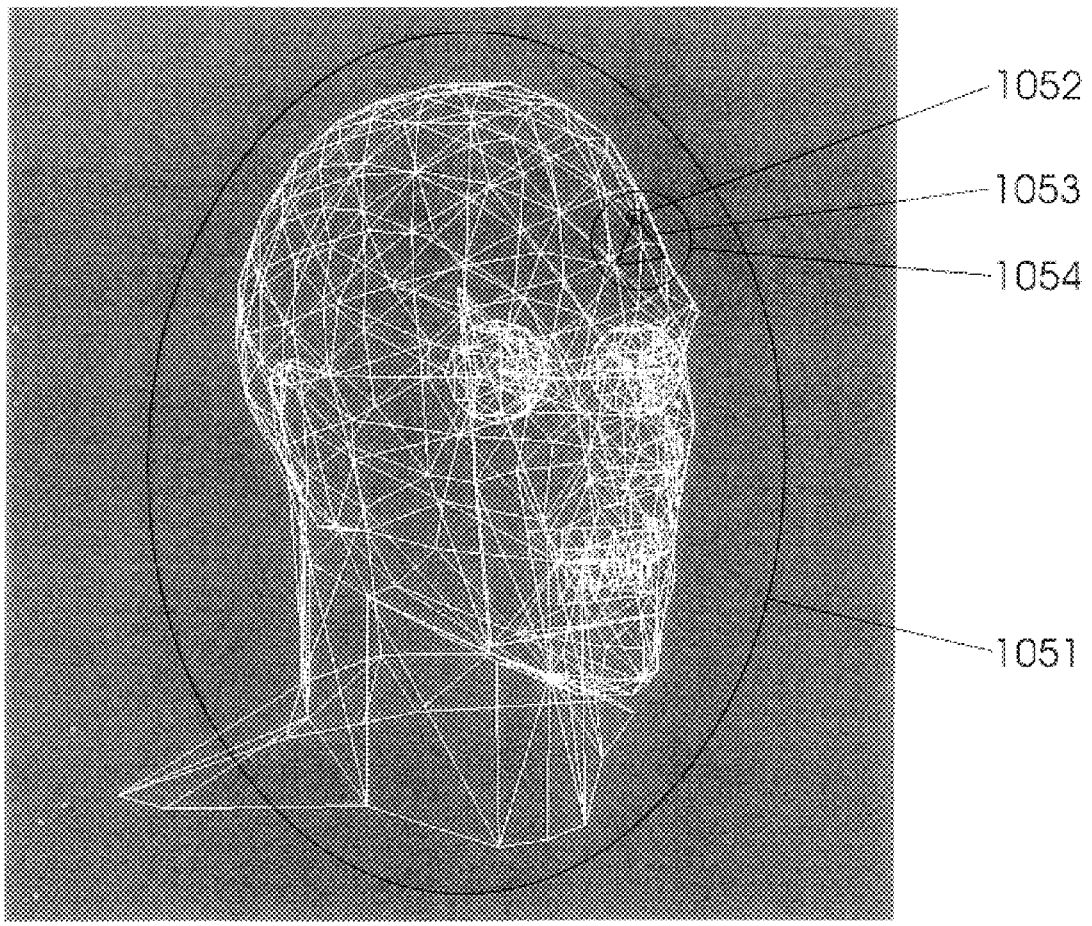

In this embodiment, the neutral geometry 933 is based on the image of a person's head that has been captured using any of a variety of known methods (e.g., video, scanner, etc.). Referring to FIG. 10, the image data of the person's head is placed onto a polygonal model 1051. The polygonal model comprises a plurality of vertices 1052 and connections 1053 that extend between the vertices. Each polygon 1054 of the polygonal model is defined by three or more vertices 1052. To show the generation and application of deltasets to the polygonal model of FIG. 10a, an example is discussed below using simple polygons (e.g., a square, a triangle, a rectangle, and a circle).

Each polygon has an identifiable shape. For example, looking at FIG. 11a, a square polygon is shown having 8 vertices (points 1100 to 1107) in two-dimensional space. By moving individual vertices, the square polygon can be converted into a number of other polygon shapes such as a rectangle (FIG. 11b), a circle (FIG. 11c) and a triangle (FIG. 11d; where vertices 1100, 1101, and 1107 all occupy the same point in two-dimensional space). A deltaset is a set of steps that are taken to move each vertex (1100 to 1107) from a starting polygon to a target or destination polygon. For example, the steps that are taken from the square polygon of FIG. 11a to the rectangular polygon of FIG. 11b include vertices 1105, 1106, and 1107 moving to the left a certain distance "x"; points 1101, 1102, and 1103 moving to the right the same distance "x"; and vertices 1100 and 1104 staying in the same location. Thus, the deltaset defines the path taken by each vertex in transforming the starting polygon to the destination polygon. In other words, the deltaset defines the difference in position of corresponding vertices in the starting and target polygons. Similarly, deltasets can be created for the transformation of the square polygon of FIG. 11a to the circle polygon of FIG. 11c and of the square polygon of FIG. 11a to the triangle polygon of FIG. 11d.

In this embodiment, the deltaset is created by transforming a starting polygon shape into another, however, one skilled in the art will appreciate that a deltaset can be created that are not based on specific starting and target shapes, but created in the abstract. Moreover, once a deltaset is created, it can be used on any starting shape to create a new shape. For example, the deltaset used to transform the square polygon of FIG. 11a to the rectangle polygon of FIG. 11b (for convenience, referred to as Deltaset1) can be used on the circle polygon of FIG. 11c. Thus, the circle polygon of FIG. 11c becomes the starting shape and after applying Deltaset1, would become the ellipse polygon of FIG. 11f (i.e., the target shape).

Deltasets can also be combined (e.g., added together) to create new deltasets. Thus, Deltaset1, Deltaset2 (i.e., transform from the square of FIG. 11a to the circle of FIG. 11c), and Deltaset3 (i.e., transform from the square of FIG. 11a to the triangle of FIG. 11c) can be polygon of FIG. 11a, the target shape of FIG. 11f is achieved. In its simplest form, the starting polygon, destination polygon, and deltaset must have the same number of vertices. Additional algorithms would be necessary to transform between shapes or objects having a differing number of vertices.

An additional method for moving vertices can be derived from the deltaset method wherein the motion to the points of a deltaset are interpolated such that a continuous field of motion is created. These fields which we refer to as delta-zones can be used to morph images irrespective of their particular triangle strip set because a one to one correspondence between movements and vertices upon which the deltasets rely are replaced by a dynamical system of motion which operates on any number of vertices by moving them in accordance with their original location.

Herein, an example of the implementation of deltasets and their operation on graphical images will be described with reference to pseudocode based on "C" and "C++" programming that is known in the art. The datatype structure for a deltaset (Deltaset_Type) is similar to that for a basic shape object, and the pseudocode is shown in Table I.

TABLE I

```
//////////////////////////////////////////////////
// Basic datatype structure of a deltaset.
typedef struct {
        dataPoint_Type *dataPoints;  // Array of delta values
        int            numPoints;    // Number of points in above
        } deltaSet_Type, shape_Type;
//      end of datatype structure
//////////////////////////////////////////////////
```

As seen from the above, the Deltaset_Type and shape_type variables each include an array of [numpoints] values. Each value is a position of a vertex for the shape_type variable and delta value for the Deltaset_Type variable.

An example of a core routine for the creation of a deltaset through the calculation of the steps or difference values from a starting object to a destination object is shown in Table II.

TABLE II

```
//////////////////////////////////////////////////
// core Routine to calculate the steps from a source(neutral)
// object to a destination object and store those steps
// in a deltaset.
Deltaset_Calc(deltaSet_Type  *dset,
              shape_Type     *src
              shape_Type     *dest)
{
int         i;
int         numpts;
dataPoint_Type delta;
// Ensure that dset has a matching number of data points
// as the shapes.
Numpts = src -> numPoints;
deltaSet_SetNumPts(dset, numpts);
// For each data point in the objects, calculate the
// difference between the source and the destination
// and store the result in the deltaset.
for (i = 0; i < numpts; i++)
    {
    delta = dest -> dataPoints[i] - src -> dataPoints[i];
    dset -> dataPoints[i] = delta;
    }
}
// end of routine
//////////////////////////////////////////////////
```

As can be seen from the above pseudocode, the variable "delta" is used to temporarily store the difference in position between the source (src) and destination (dest) for each of the vertices in the shape. Each delta value is then stored in a deltaset array (dset). Once a deltaset array is created, it can be easily applied to any starting shape having an equal number of vertices to form a new target shape.

An example of pseudocode that can be used to modify a deltaset so that it can be applied to a starting shape is shown in Table III.

TABLE III

```
//////////////////////////////////////////////////
// core Routine to apply the steps stored in a
// deltaset to a shape, with a percentage amount.
// Note that negative amounts can be used.
deltaSet_Apply   (deltaSet_Type  *dset,
                 shape_Type      *dest,
                 float           amount)
{
int  i;
if (amount == 0.0)
    return;
for (i = 0 ; i < dset -> numPoints; i++)
    {
    dest -> dataPoints[i] += (dset -> dataPoints [i] * amount);
    }
}
// end of routine
//////////////////////////////////////////////////
```

As seen from above, during the routine Deltaset_Apply, calculations for a single transition are performed based on a percentage amount passed using the "amount." Each data point in the destination shape is calculated based on the deltaset value for that point multiplied by the percentage value "amount" (which can have a negative value or a value greater than 1).

The pseudocode of Table IV shows two utility routines that are used for creating a new, blank deltaset and to set the number of datapoints.

TABLE IV

```
//////////////////////////////////////////////////
// utility Routine to create a new, Blank deltaset
deltaSet_Type *NewDeltaSet ()
{
allocate a new deltraSet_Type and return a pointer to it.
}
// end of routine
//////////////////////////////////////////////////
//////////////////////////////////////////////////
// utility Routine to set the number of datapoints
// in a deltaset.
deltaSet_SetNumPts (deltaSet_Type *dset, int numPoints)
{
de-allocate dset -> dataPoints, if not already empty;
allocate an array of type dataPoint_Type and size numPoints,
    and put it in dset -> dataPoints;
dset -> numPoints = numPoints;
}
// end of routine
//////////////////////////////////////////////////
```

With reference to Table V, an example of pseudocode is shown for the transformation from the square shape of FIG. 11a to the shape of FIG. 11e.

TABLE V

```
//////////////////////////////////////////////////
// The following pseudocode example shows how
// to use the above deltaset routines to morph from a
// square to a new shape which has features of both the
// rectangle and the circle.
// Define the basic dataPoint that makes shapes & deltasets.
typedef 2DVector dataPoint_Type;
// Declaration of basic shapes.
shape_Type   Square,
             Rectangle,
             Circle;
// Declaration of deltasets.
```

TABLE V-continued

```
deltaSet_Type  rect_dset,
               circ_dset;
// Declaration of a new shape to get the data put into it.
shape_Type     newshape;
// Initialize shapes.
shape_SetNumPoints(&square,      8);
shape_SetNumPoints(&rectangle,   8);
shape_SetNumPoints(&circle,      8);
// set data points at square, rectangle, and circle.
shape_SetPoints (&square,      ( 0.0,    1.0),
                               ( 1.0,    1.0),
                               ( 1.0,    0.0),
                               ( 1.0,   -1.0),
                               ( 0.0,   -1.0),
                               (-1.0,   -1.0),
                               (-1.0,    0.0),
                               (-1.0,    1.0));
shape_SetPoints (&rectangle,   ( 0.0,    1.0),
                               ( 2.0,    1.0),
                               ( 2.0,    0.0),
                               ( 2.0,   -1.0),
                               ( 0.0,   -1.0),
                               (-2.0,   -1.0),
                               (-2.0,    0.0),
                               (-2.0,    1.0));
shape_SetPoints (&circle,      ( 0.0,    1.0),
                               ( 0.0,    1.0),
                               ( 0.0,    1.0),
                               ( 0.0,    1.0),
                               ( 0.0,    1.0),
                               ( 0.0,    1.0),
                               ( 0.0,    1.0),
                               ( 0.0,    1.0));
// calculate DeltaSets
deltaSet_Calc (&rect_dset, &square, &rectangle);
deltaSet_Calc (&circ_dset, &square, &circle);
//////////////////////////////////////////////////
// The resulting DeltaSets now contain the values:
// rect_dset:  ( 0.0,     0.0)
//             ( 1.0,     0.0)
//             ( 1.0,     0.0)
//             ( 1.0,     0.0)
//             ( 0.0,     0.0)
//             (-1.0,     0.0)
//             (-1.0,     0.0)
//             (-1.0,     0.0)
//
//circ_dset:   ( 0.0,     0.0)
//             (-0.4,    -0.4)
//             ( 0.0,     0.0)
//             (-0.4,     0.4)
//             ( 0.0,     0.0)
//             ( 0.4,     0.4)
//             ( 0.0,     0.0)
//             ( 0.0,    -0.4)
//////////////////////////////////////////////////
// Apply the DeltaSets.
newshape = copy of square;
deltaSet_Apply(&rect_dset, &newshape, 1.0);
deltaSet_Apply(&circ_dset, &newshape, 1.0);
//////////////////////////////////////////////////
// newshape now contains values which
// look like the ellipse drawn above:
//             ( 0.0,     1.0)
//             ( 1.6,     0.6)
//             ( 2.0,     0.0)
//             ( 1.6,    -0.6)
//             ( 0.0,    -1.0)
//             (-1.6,    -0.6)
//             (-2.0,     0.0)
//             (-1.6,     0.6)
//////////////////////////////////////////////////
// to create the egg-ish shape above,
// one would simply add a third DeltaSet
// based on a triangle shape.
// ---------------end of simple geometry example//////////////
```

As seen from the pseudocode of Table V, a datapoint is defined as a two-dimensional vector and the square, rectangle, and circle shapes are defined as eight points with abscissa and ordinate values. Deltasets are then calculated for the transition from square to rectangle and from square to circle. As seen above, the resulting deltasets (rect_dset and circ_dset) represent differences between abscissa and ordinate values of the respective starting and target images. The deltasets can then be applied to a starting shape (in this example, the starting image, newshape, is set to the square shape of FIG. 11a). First the rect_dset deltaset is applied to the square shape to form an intermediate shape, and then the circ_dset deltaset is applied to this intermediate shape to form the destination shape that is shown in FIG. 11e. To get to the shape of FIG. 11a, a deltaset representing a transformation between the square shape of FIG. 11a to the triangle shape of FIG. 11d is created and applied to the ellipse shape shown in FIG. 11f.

The deltasets example, above, can be easily extended to a three-dimensional representation. The example can also be expanded to more intricate and complex applications such as in three-dimensional space and facial animation. As the application of deltasets becomes more complex in facial animation, several additional features can be added. For example, certain motions of the face are limited to certain defined areas, such as blinking of the eyes. Accordingly, a deltaset for an entire face would be mostly 0's (indicating no change) except for the eyes and eyelids, thus isolating these areas for change. To improve efficiency, the deltaset datatype can be changed so that only non-zero values are stored. Thus during the execution of the Deltaset_apply routine, only the points that change are acted upon, rather than every point in the graphical representation.

An embodiment of facial animation is described below with reference to the pseudocode example of Table VI.

TABLE VI

```
// The following pseudocode example shows how deltaset
// morphing is used to fully animate and morph a face.
// Note that this achieves a "moving morph", wherein the
// overall structure of the face can smoothly change without
// interrupting the process of other facial animation such
// as blinking, emoting, and speaking.
//////////////////////////////////////////////////////////
// Setup
// Define the basic dataPoint that makes shapes & deltasets.
typedef 3DVector dataPoint_Type;
// Declaration of basic shapes & deltasets.
shape_Type     neutralFace,
               overallMorphface,
               blinkFace,
               emoteFaces [],
               speakFaces [],
               newShapeFace;
deltaSet_Type  overall_dset,
               blink_dset,
               emote_dsets[],
               speak_dsets[];
// neutralFace is the geometry of the basic 3D face,
//    no expression, looking straight ahead.
// overallMorphFace is a radically different face,
//    say a cat.
// blinkFace is the same as neutralFace but with eyes closed.
// emoteFaces is an array of faces with different emotions or
//    expressions. ie Happy, sad, angry, trustful etc.
// speakFaces is an array of faces in different phoneme (or
//    "viseme") positions. ie "OO", "AE", "L", "M" etc.
// newShapeFace is a shape which is the destination of the
//    morphing.
// Declarations of amount of morphs.
// These typically range from 0.0 to 1.0, but can be outside
```

TABLE VI-continued

```
// of this range.
float overallMorphAmount, blinkAmount,
      emoteAmounts[], speakAmounts[];
// Other declarations
float time;         // a pseudo time variable.
int   numEmotes;    // the number of emotion faces.
int   numSpeaks;    // the number of viseme faces.
//////////////////////////////////////////////////////////
// initialize the deltasets
deltaSet_Calc(&overall_dset, &neutralFace, &blinkFace);
deltaSet_Calc(&blink_dset, &neutralFace, &blinkFace);
for (i = 0; i < numEmotes; i++)
    deltaSet_Calc( &emote_dsets[i],
                   &neutralFace,
                   &emoteFaces [i]);
for (i = 0; i < numSpeaks; i++)
    deltaSet_Calc( &speak_dsets [i],
                   &neutralFace,
                   &speakFaces [i]);
//////////////////////////////////////////////////////////
// Main animation loop
while (KeepRunning)
{
time += 0.1;
// Calculate the amount each morph is to be applied.
// For emoteAmounts and speakAmounts, this is an array
// of values most of which are zero.
// (Note that deltaSet_Apply() returns immediately if
// amount == 0.0)
CalBlinkAmount (&blinkAmount);
CalEmoteAmounts (emoteAmounts);
CalcSpeakAmounts (speakAmount);
overallMorphAmount = sin(time) * 0.5 + 0.5;
// Reset the working copy of the face.
newShapeFace = Copy of neutralFace;
// Apply the data sets controlling facial animation.
deltaSet_Apply(blink_dset, &newShapeFace, blinkAmount);
for (i = 0; i< numEmotes; i++)
    deltaSet_Apply(&emote_dsets[i],
                   &newShapeFace,
                   emoteAmounts [i]);
for (i = 0 i < numSpeaks; i++)
    deltaSet_Apply(&speak_dsets[i],
                   &newShapeFace,
                   speakAmounts [i]);
// Apply the overall shape morph
deltaSet_Apply(&overall_dset,
               &newShapeFace,
               overallMorphAmount);
}
// End of animation loop
//////////////////////////////////////////////////////////
//---------------end of facial moving morph example----------
```

Figure 12A:
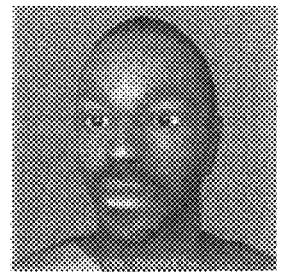
FIGS. 12a–g are graphical images of a person's head that are generated in accordance with an embodiment of the present invention.
Figure 12B:
Figure 12C:
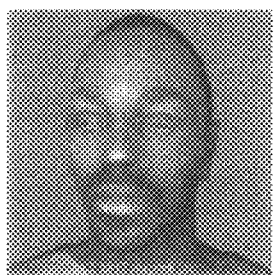
Figure 12D:
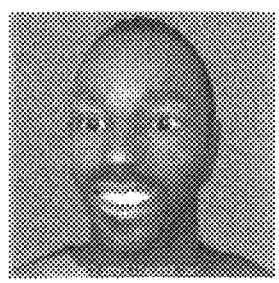
Figure 12E:
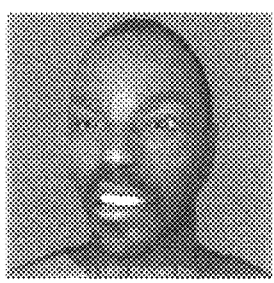
Figure 12F:
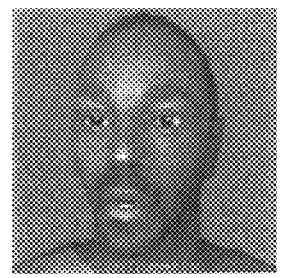

As seen from the above, the animated face image comprises three-dimensional datapoints. "NeutralFace" is a starting image that will be changed based on one or more deltasets. The neutralface image is shown in FIG. 12a with eyes looking straight ahead and no expression. "OverallMorphFace" is a different face from NeutralFace. In this example, OverallMorphFace is in the image of a cat shown in FIG. 12b. A face showing a completed facial movement is "blinkface" which shows the same face as NeutralFace but with the eyes closed (see FIG. 12c). "EmoteFaces" is an array of the neutralFace augmented to show one or more emotions. For example, FIG. 12d shows the neutralFace emoting happiness, FIG. 12e shows neutralFace emoting anger, etc. "SpeakFaces" is an array of faces showing expressions of different phonemes. a phoneme, or viseme, is a speech syllable used to form spoken words (e.g., the "oo", "ae", "l", and "m" sounds). As an example, FIG. 12f shows neutralFace expressing the phoneme "oo."

The amount of transformation or morphing can be controlled by multiplication or multiplier values, overallMorphAmount, blinkAmount, emote Amounts[ ], and speakAmounts[ ]. As an example, if blinkAmount is set to 1.0 then when applying a deltaset for blinking to neutralFace of FIG. 12a will achieve the face of FIG. 12c (i.e., 100% of the blink is applied). Numbers less than or greater than 1.0 can be selected for these variables.

Deltasets are then created for transforming the neutralFace image. As can be seen from the pseudocode of Table VI, deltaset overall_dset is created for the changes between neutralFace (FIG. 12a) and overallMorphFace (FIG. 12b); deltaset blink_dset is created for the changes between neutralFace (FIG. 12a) and blinkFace (FIG. 12c); deltasets emote_dsets[ ] are created between neutralFace (FIG. 12a) and each emotion expression image (e.g., the "happy" emoteFace[ ] of FIG. 12d and the "angry" emoteFace[ ] of FIG. 12e; and deltasets speak dsets[ ] are created between neutralFace (FIG. 12a) and each phoneme expression image (e.g., the "oo" speakFace[ ] of FIG. 12f).

Figure 12G:
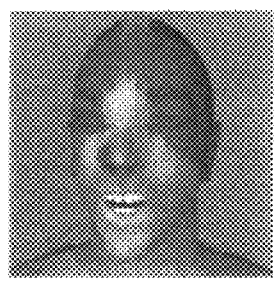

In the main animation loop, the amounts for each deltaset transformation are calculated (e.g., the values for overallMorphAmount, blinkAmount, emoteAmount[ ]s, and speakAmounts[ ]). For the emoteAmounts[ ] and speakAmounts[ ] arrays, these values are mostly zero. The new facial image to be created is stored in newShapeFace and is originally set to the NeutralFace image. Then, the deltasets that were calculated above, are applied to the newShapeFace in amounts set in transformation variables calculated above. In this example, overallMorphAmount is set to 0.5 (i.e., halfway between neutralFace and overallMorphFace; blinkAmount is set to 1.0 (i.e., full blink—eyes closed); emoteAmount[ ] for "happy" is set to 1.0 while all other emoteAmount[ ] values are set to 0; and speakAmount[ ] for the phoneme "oo" is set to 1.0 while all other speakAmount[ ] values are set to 0. The resulting image based on these variables is shown in FIG. 12g.

Figure 10B:
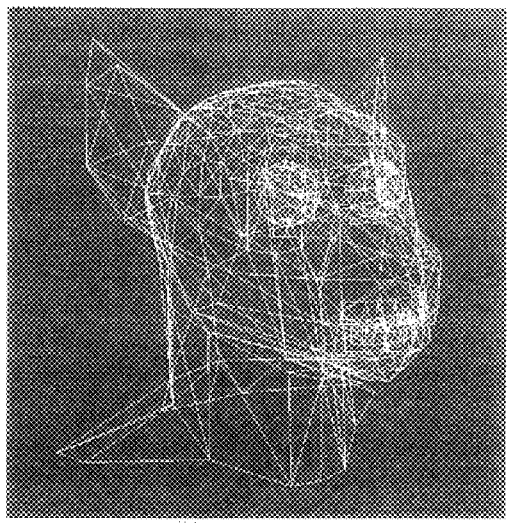
Figure 14A:
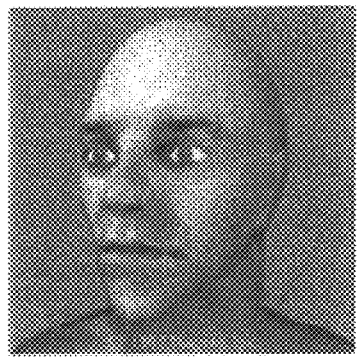
FIGS. 14a–d are graphical images of a person's head that are generated in accordance with an embodiment of the present invention.
Figure 14B:
Figure 14C:
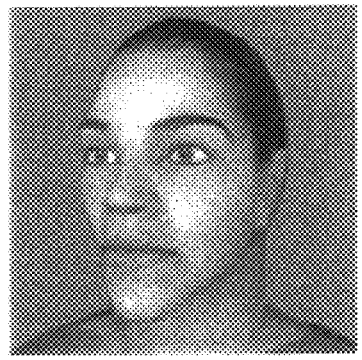
Figure 14D:

As described above, the deltasets that have been created can now be applied to another starting image (i.e. an image other than neutralFace shown in FIG. 12a) without recalculation. This is shown in the examples of FIGS. 14a–d. Using the method set forth above, a deltaset can be created between neutralFace and overallMorphFace which signifies the changes between a male human face (shown in FIG. 12a) and the face of a cat (shown in FIG. 12b). As seen in FIG. 14a, a neutral, male human face is shown without application of this deltaset. FIG. 14b shows the effects of the application of this deltaset (or fractional value of this deltasct) in that the male human face now looks "cat-like." The underlying polygonal model for FIGS. 14a and 14b are shown in FIGS. 10a and 10b, respectively. As seen in FIGS. 10a and b, vertices of the first image are shown to move to different positions in the destination image. Referring back to FIGS. 14a and 14b, one skilled in the art will appreciate that the color of each pixel can also change in accordance with a deltaset storing the difference in color for each pixel in the human and cat images of these figures. The deltaset described above can be applied to a neutral, female human face (see FIG. 14c) to form a new destination image (see FIG. 14d).

Figure 13A:
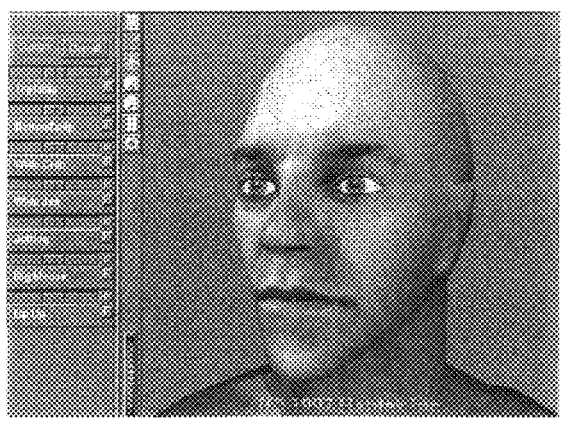
FIG. 13 shows an input device for controlling the amount of transformation occurs when applying a deltaset to an image.
Figure 13B:
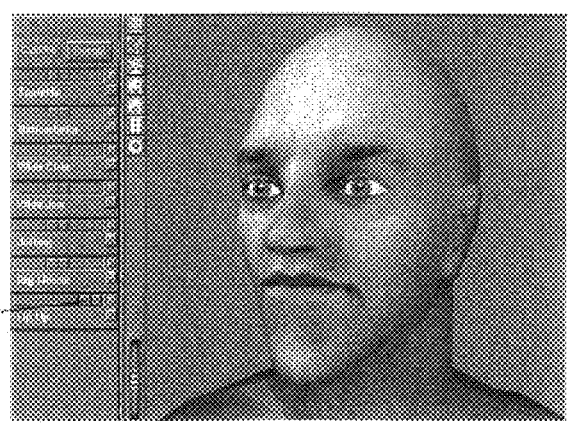
Figure 13C:
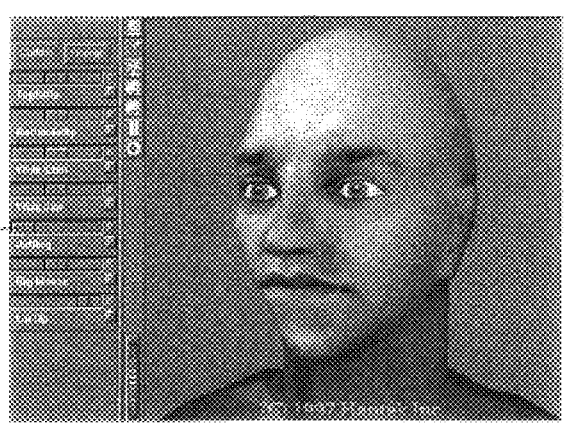
Figure 13D:
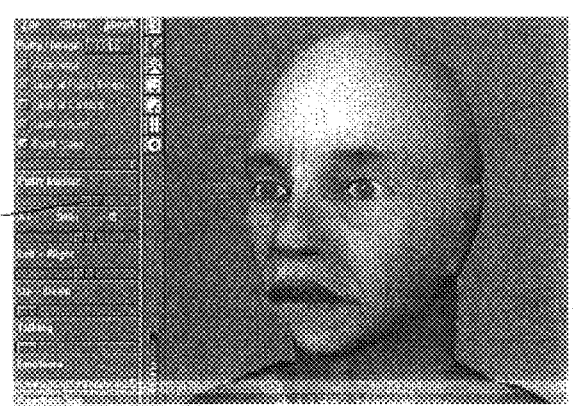

Also, the variables (e.g., overallMorphAmount) can be input using graphical sliders shown in FIGS. 13a–d. In this example, several deltasets have been previously determined, a first deltaset represents the difference between a starting image with lips in a first position and a target image with lips in a second, higher position. a second deltaset represents the difference between a starting image with jaw in a first position and a target image with the jaw in a second, jutted-out position. a third deltaset represents the difference between a starting image with relatively smooth skin and a target image with old (i.e., heavily textured skin). Referring to FIGS. 13a–d, the amount each of these first, second, and third deltasets is applied to the neutral image of FIG. 13a is determined by the placement of one or more sliders 1301–1303. In this example, if the slider is in a central position, then the deltaset is not applied at all (i.e., the deltaset multiplied by 0.0 is applied to the image). If the slider is placed to the right, the deltaset multiplied by 1.0 is applied to the image and if it is placed to the left, the deltaset multiplied by –1.0 is applied to the image. Accordingly in FIG. 10a, sliders 101–03 are in a central position. In FIG. 13b, slider 1301 is moved (e.g., with a mouse, not shown) to the right causing the first deltaset (multiplied by 1.0) to be applied to the neutral image of FIG. 13a (thus, the lips are moved up some distance). Likewise, in FIG. 13c, slider 1302 is moved to the left, and the second deltaset described above (multiplied by –1.0) is applied to the image of FIG. 13b (thus, the jaw is recessed). Also, in FIG. 13d, slider 1303 is moved to the right causing the third deltaset (multiplied by 1.0) to be applied to the image of FIG. 13c. One skilled in the art will appreciate that the sliders 1301–03 can have intermediate values between –1.0 and 1.0 or can have values beyond this range.

Figure 15:
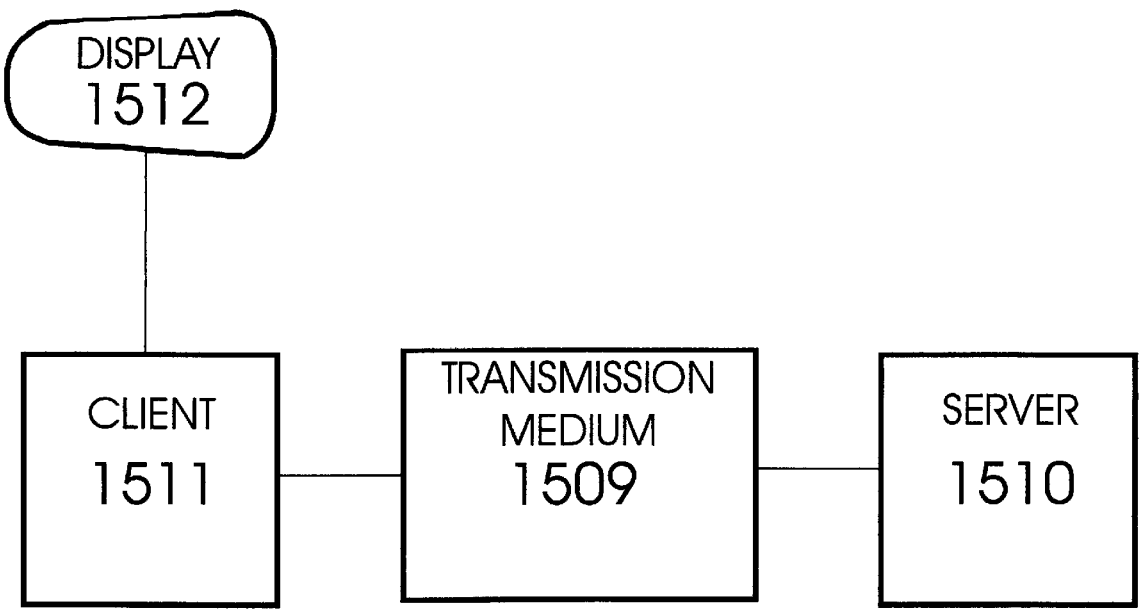
FIG. 15 shows a communication system environment for an exemplary method of the present invention.

As seen from the above, once one or more deltasets have been created, the multiplier values that are controlled by sliders 1301–03 (for example) of the embodiment of FIG. 13 would be the only input necessary to modify a starting image. This feature is advantageous in the area of communications. Referring to FIG. 15, a communication system is shown. In this system, a first component (such as server 1510) is coupled via a transmission medium 1509 to a second component (such as client 1511 coupled to a display 1512). In this example, the transmission medium 1509 is the so-called Internet system that has a varying, but limited bandwidth. The server 1510 and client 1511 are computer systems similar to system 801 of FIG. 8. a first image (e.g., a person=s face) is transmitted over the transmission medium 1509 from the server 1510 to the client as well as any desired deltasets (as described above). Some code may also be sent, operating as described herein. The image and deltasets can be stored at the client 1511 and the image can be displayed at display 1512. For the server 1510 to change the image at the client 1511, an entire, new image need not be sent. Rather, the multiplication values for the deltasets (e.g., the values controlled by sliders 1301–03 in FIG. 13) can be sent over the transmission medium 1509 to cause the desired change to the image at display 1512. Thus, a great savings in bandwidth is achieved allowing greater animation and control of the image.

In another example, the system of FIG. 15 can be used as a video phone system where the original image that is sent is that of the speaking party at the server 1510 over the transmission medium 1509 (e.g., plain old telephone system (POTS)). Speech by the user at the server 1510 can be converted into phonemes that are then converted into multiplication values that are transmitted over the transmission medium 1509 with the voice signal to facilitate the "mouthing" of words at the client 1511.

As described above, a graphical image of a human, for example, can be made to express emotions by applying a deltaset to a neutral, starting image of the human. If the expression of emotions is autonomous, the computer graphical image of the human will seem more life-like. It could be concluded that humans fit into two categories or extremes: one that represents a person who is emotionally unpredictable (i.e., expresses emotions randomly), such as an infant, perhaps; and one that has preset reactions to every stimulation. According to an embodiment of the present invention, an "emotional state space" is created that includes a number of axes, each corresponding to one emotion. For example, assuming that there are only two emotions, "happy" and "alert," then at point (1.0, 0.0), the person is happy and not sleepy or excited; at point (0.0, 1.0), the person neither happy nor sad, but is excited, at point (−1.0, −1.0), the person is sad and sleepy. Though there are many more emotions that can be expressed, a person typically will be expressing no more than one or two emotions at a time. Referring back to FIG. 9, element 937 provides input for changing the neutral image based on the expression of emotions. An example of pseudocode for the expression of emotions is shown in Table VIII. In this pseudocode, two emotions are selected: one that is to be expressed and one that is currently fading from expression.

TABLE VIII

```
PSEUDOCODE example ----------------------------
// This is pseudocode based in part on "C".
// First is pseudocode for the random walk
// style of autonomous emoting, second
// is the reaction style.
// These routines determine the amount that each emotion
// in the emotion library is currently expressed
// in the artificial human. They do not
// actually express the emotions. One method
// of expressing the emotions is detailed above.
////////////////////////////
// These variables are the basic
// output.
// emoteAmounts is an array of floats that represents
//    the degree to which each emotion in the emotion
//    library is currently playing on the face.
// emoteNum is the number of emotions in the library.
float    emoteAmounts[];
int      emoteNum;
////////////////////////////
// These variables are the two
// emotions present at one moment.
// nextEmote & nextAmount are the
// current destination emotion &
// how much of it.
// lastEmote is the emotion currently
// fading away.
int      nextEmote        = 0;
float    nextAmount       = 0.0;
int      lastEmote        = 0;
////////////////////////////
// This variable is the number
// of seconds it will take the
// lastEmote to fade completely.
float    decaySecs         = 3.0;
////////////////////////////
// This variable is the number
// of seconds it will take to
// go from the current emotion amount
// to the next amount.
float    changeSecs        = 0.5;
////////////////////////////
// Routine to use a random walk to
// navigate an emotional state-space.
// This implementation uses only two
// emotions at one time, and calls them
// nextEmotion and lastEmotion. The
// dynamic model is basically that of a
// human baby, emoting at random.
// The routine basically chooses an emotion
// To go to, then increases its value while
// decreasing the value of the previous one.
// The input variable dt is the amount of
// time elapsed since the last call.
calcEmoteAmountsRandom(float dt)
{
////////////////////////////
```

TABLE VIII-continued

```
// These variables are probabilities
// of an event per second.
float    probabilityofNewEmote    = 0.01;
float    probabilityofNewAmount   = 0.2;
// Decay old emotions, go towards new.
DoDecayAndRamp();
////////////////////////////
// now decide if we go to a new emotion.
// decide if we want to go to a new value
// of the current emotion without changing
// which emotion it is.
if (unitRand() *dt <= probabilityOfNewAmount)
    {
    nextAmount = select a new random amount of emotion;
    }
// decide if we want to go to a new emotion
if (unitRand() *dt <= probabilityOfNewEmote)
    {
    nextEmote = a random integer >= zero and < emoteNum;
    nextAmount = select a new random amount of emotion;
    }
}
// End of routine.
////////////////////////////
////////////////////////////
// Routine to calculate the amount
// of each emotion based on reactions
// to objects in the scene.
// This routine relies on objects with data-
// structures that contain an emotion,
// a degree of reactivity, and position.
CalcEmoteAmountsReact(float dt)
{
// Decay old emotions, go towards new.
DoDecayAndRamp();
// Determine object of most interest.
for (i = 0; i< numberOfObjects; i++)
    {
    objectReactionLevel[i] = metric which
    incorporates object's visibility, speed, speed
    towards              viewer, inherent
    emotional
            reactivity (how exciting it is), and
            distance to center of vision;
    }
mainObject = index of largest value in
objectReactionLevel;
    // Set next Emotion & Amount.
    nextEmote = Object #mainobject -> reaction;
    nextAmount = objectReactionLevel[mainObject];
    }
// End of routine
// Note that mainObject is also used to move the artificial
//    human's eyes and head towards the object, or to start
//    walking towards the object, and other manifestations
//    of being interested in something.
////////////////////////////
////////////////////////////
// Routine to decay the last emotion and
// ramp towards the next value of the
// new emotion.
DoDecayAndRamp()
{
// Decrease value of all emotions besides current one.
for (i = 0; i < emoteNum; i++)
    {
    if (i != nextEmote)
        {
        emoteAmounts[i] −= dt/decaySecs;
        if (emoteAmounts[i] < 0.0)
            emoteAmounts [i] 0.0;
        }
    }
// Change value of current emotion towards
```

TABLE VIII-continued

```
        // next level.
        // First, calculate the direction of change.
        currAmount = emoteAmounts [lastEmote];
        diff = nextAmount - currAmount;
        if      (diff > 0.0)
                    direction = 1.0;
        else    if (diff < 0.0)
                    direction = 1.0;
        else
                    direction = 0.0;
        // Now go in that direction at appropriate
speed.
        currAmount += dt * direction * changeSecs;
        // stop at ends.
        if   ((direction == 1.0 AND currAmount >
nextAmount) OR
             (direction == -1.0 AND currAmount <
nextAmount))
            currAmount = nextAmount;
        emoteAmounts [nextAmount] = currAmount;
        }
// end of decaying and ramping routine
//////////////////////////////////
//////////////////////////////
// Utility function unitRand.
float unitRand()
        {
        return a random number >= 0.0 and <= 1.0;
        }
```

As seen from above, emoteAmounts [ ] is an array of values for the current expression of one of "emoteNum" emotions. For example, for the emotion "happy", a value is set (e.g, between −1.0 and 1.0) to indicate the current state of the graphical image (e.g., FIG. 12D shows neutralFace emoting "happy" with a value of 1.0). The nextEmote variable stores the level of the next emotion to be expressed. The lastEmote variable stores the level of the emotion that is currently being expressed, and is also fading away. The number of seconds for this emotion to fade to 0.0 is stored in the variable decaySecs. The number of seconds for the next emotion to be expressed after the current emotion amount goes to 0.0.

During the CalcEmoteAmountRandom routine, probability values for going to the next emotion (probabilityOfNewEmote) and of changing to a new amount for the current emotion (probabilityOfNewAmount) are set. Then a random number is generated, and if that number is less than the probability value, a new random amount of emotion is assigned to the variable nextAmount. a second random number is selected, and if that number is less than the probability value, a next emotion is selected from the available ones, and a random amount is assigned to the nextAmount variable.

During the routine CalcEmoteAmountsReact, the objects that are around the graphic image of the person are analyzed to determine which object is of most interest (e.g., by assigning weighted values based on the object's visibility, speed, speed towards the graphical image of the person, the inherent emotional reactivity of the object, and its distance to center of vision for the graphic image of the person). Each object has a data structure that includes a predefined emotion, a degree of reactivity and position. For example, a gun object, would elicit a "fear" emotion with a high degree of reactivity depending on how close it is (i.e., distance) to the person. Accordingly, based on the object of most interest (and the relationship between the person and the object), a nextEmotion is selected and a nextAmount is selected based on the object and the random numbers referenced above determine whether that next Emotion is to be expressed by the human image. Using the routines of Table VIII, the human image expresses emotions that are more lifelike in that they are somewhat random, yet can occur in response to specific stimuli.

Referring back to FIG. 8, an input device 830 is provided for the input of data for the creation of graphic images to be output to display 820. The input device 830 can be a variety of components including a video camera, a magnetic tracker monitor, etc. In one such system, selected points are tracked on a person's face. These devices output a stream of information that are commensurate with the coordinates of a number of select locations on a person's face as they move (see element 939 in FIG. 9). For example, 6 locations around the mouth, one on each eyelid, one on each eyebrow, one on each cheek, can all be tracked and output to the computer system of FIG. 8.

The method of face tracking according to an embodiment of the present invention, a neutral three-dimensional model of a person is created as described above. a test subject (e.g., a person) is used having a set of markers on his/her face (as described above). For each marker, three three-dimensional model faces are created, one for each 3D axis (e.g., the x, y and z axes). Each of these models is the same as the neutral model except that the specific marker is moved a known distance (e.g. one inch or other unit) along one of the axes. Thus, for each marker, there is a contorted version of the neutral image where the marker is moved one unit only along the x-axis; a second image where the marker is moved along one unit only along the y-axis; and a third image where the marker is moved along one unit only along the z-axis. Deltasets are then created between the neutral image and each of the three contorted versions for each marker.

With the deltasets created, the input stream of marker positions are received from the input device 830. The neutral image is then modified with the appropriate deltaset(s) rather than directly with the input positions. If marker data is only in two dimensions, then only two corresponding distorted models are needed (and only two deltasets are created for that marker). Movement of one marker can influence the movement of other points in the neutral model (to mimic real-life or as desired by the user). Also, the movement of a marker in one axis may distort the model in more than one axis (e.g., movement of the marker at the left eyebrow in a vertical direction may have vertical and horizontal effects on the model). An example of pseudocode for implementing the input of marker positions is shown in Table IX.

TABLE IX

```
// This pseudocode is based in part on "C".
// It takes as input:
//      * An array of vector data representing the spacial
//      displacement of a set of facial markers.
//      * An array of DeltaSets setup as described above,
//      with numDimensions DeltaSets for each marker.
//      * a 3D model of a "neutral face", as described above.
// It outputs:
//      * a 3D model of a face which mimics the motion of the
//      actual face with which the markers are associated.
        int         numMarkers;
        int         numDimensions;
        float       markerDisplacements [numMarkers]
[numDimensions];
        DeltaSet    markerDeltaSets [numMarkers] [numDimensions];
        Shape       neutralFace;
        Shape       outputFace;
        // numMarkers is the number of discrete locations being
        //      tracked on the source face. Typically 6–14, but
```

TABLE IX-continued

```
//    under no limitations.
// numDimensions is the number of dimensions reported by
//    the markerDisplacements array.
// markerDisplacements is an array of vectors with one vector
//    for each marker on the source face. These values should
//    be updated once per frame.
// marker DeltaSets is a 2D array of DeltaSets of size
//    numMarkers x numDimensions.
// neutralFace is the original, undistorted 3D face model.
// outputFace is a 3D model that will mimic the source face.
////////////////////////////////////////////////////////////
////    // The main animation loop. Runs once per frame.
   MainAnimationLoop ()
   {
      outputFace = copy of neutralFace;
      // Loop over each marker and each reported dimension.
      for (m = O; m < numMarkers; m++)
      {
         for (d = O; d < numDimensions; d++)
         {
            deltaSet_Apply (markerDeltaSets [m] [d],
                   & outputFace,
                   MarkerDisplacements [m] [d]);
         }
      }
   }
//
// End of main animation loop.
////////////////////////////////////////////////////////////
```

As seen from the above, the neutral face image that is input is modified with the created deltasets to mimic the resultant movements in the face caused by physically moving the attached markers. Without distortion, neutralFace is the original 3D face model and outputFace is a 3D model that mimics the movement of the subject's face. During the main animation loop, which can run once per frame, each marker is analyzed for its position. The resulting displacement of the marker is then applied to the outputFace (which starts as a copy of neutralFace) through the use of the Deltaset_apply routine discussed above and the deltasets that have been previously created.

What is claimed is:

1. A communication system, comprising:
   a client including a computer system and a display;
   a server including at least a computer system, said server capable of transmitting a first image and at least a first set of modification data to said client; and
   said server is capable of modifying said first image by transmitting a multiplier value to said client, such that said first image is modified at said client based on said first set of modification data multiplied by said multiplier value.

2. A method of modifying a starting graphical image comprising:
   (a) generating a starting image having a plurality of characteristics;
   (b) storing in a library a plurality of sets of modification data;
   (c) retrieving a first set of modification data from said library; and
   (c1) multiplying said first set of modification data by a multiplier value;
   (d) modifying said starting image based on said first set of modification data, such that a first characteristic of said starting image is changed, wherein a feature of said starting image is modified based on said first set of modification data multiplied by said multiplier value.

3. The method of claim 2 wherein said multiplier value is input by a relative position of a graphical slider.

4. The method of claim 2, further comprising repeating steps (c), (c1), and (d) for each change to one of said characteristics of said starting image.

5. The method of claim 3 wherein said multiplier value is input by a relative position of a graphical slider.

6. A method of modifying a starting graphical image comprising:
   (a) generating a first starting image having a plurality of characteristics;
   (b) storing in a library a plurality of sets of modification data;
   (c) retrieving first and second sets of modification data from said library; and
   (d) multiplying each of said first and second sets of modification data by at least one multiplier value;
   (e) simultaneously modifying a feature of said starting image based on said first and second sets of modification data multiplied by said at least one multiplier value.

7. The method of claim 6 further comprising after step (c):
   (c1) multiplying said first set of modification data by a first multiplier value; and
   (c2) multiplying said second set of modification data by a second multiplier value;
   and further wherein in step (d), said starting image is modified based on said first and second sets of modification data multiplied by said first and second multiplier values, respectively.

8. The method of claim 7 wherein said first and second multiplier values are input by relative positions of first and second graphical sliders, respectively.

9. The method of claim 7 further comprising repeating steps (c), (c1), (c2), and (d) for each change to said first and second characteristics of said starting image.

10. The method of claim 6, further comprising:
   (e) generating a second starting image having a plurality of characteristics;
   (f) retrieving said first and second sets of modification data from said library; and
   (g) modifying said second starting image based on said first and second sets of modification data, such that first and second characteristics of said second starting image are changed, respectively.

11. The method of claim 10, further comprising after step (f):
   (f1) multiplying said first set of modification data by a first multiplier value; and
   (f2) multiplying said second set of modification data by a second multiplier value.

12. A method of modifying a graphical image comprising:
   (a) generating a starting graphical image of a character, said character capable of expressing a plurality of transformations;
   (b) generating at least a first graphical object located proximately to said starting graphical image, said graphical object including a data structure defining a transformation applicable to said starting graphical image;
   (c) determining a spatial relationship between said starting graphical image and said graphical object;

(d) generating a multiplication value based on said relationship between said graphical object and said starting graphical image;

(e) multiplying a first set of modification data by said multiplication value, wherein one of said transformations to said starting graphical image is capable of being implemented based on said modification data; and (f) modifying said starting graphical image based on said first set of modification data.

13. The method of claim 12 wherein said relationship is a distance between said graphical object and said starting graphical image.

14. The method of claim 12, wherein said character includes a center of vision, such that said relationship is a distance between said graphical object and the center of vision of said character.

15. The method of claim 14, wherein at least one of said transformations is an expression of an emotion.

* * * * *

UNITED STATES PATENT AND TRADEMARK OFFICE
CERTIFICATE OF CORRECTION

PATENT NO.    : 6,320,583 B1                                          Page 1 of 1
DATED         : November 20, 2001
INVENTOR(S)   : Christopher D. Shaw and Orion Wilson It is certified that error appears in the above-identified patent and that said Letters Patent is hereby corrected as shown below:

<u>Title page,</u>
Item [73], "Haptek Corporation" should be -- Haptek, Inc. --

Signed and Sealed this

Twenty-second Day of October, 2002

*Attest:*

JAMES E. ROGAN
*Attesting Officer*                    *Director of the United States Patent and Trademark Office*